United States Patent
Douglas

(10) Patent No.: US 11,081,989 B2
(45) Date of Patent: Aug. 3, 2021

(54) CURRENT-SHAPING CIRCUIT FOR USE WITH MAGNETIC COUPLERS DOWNHOLE

(71) Applicant: Halliburton Energy Services, Inc., Houston, TX (US)

(72) Inventor: Hugh Douglas, Cheltenham (GB)

(73) Assignee: Halliburton Energy Services, Inc., Houston, TX (US)

( * ) Notice: Subject to any disclaimer, the term of this patent is extended or adjusted under 35 U.S.C. 154(b) by 783 days.

(21) Appl. No.: 15/754,926

(22) PCT Filed: Nov. 6, 2015

(86) PCT No.: PCT/US2015/059380
§ 371 (c)(1),
(2) Date: Feb. 23, 2018

(87) PCT Pub. No.: WO2017/078725
PCT Pub. Date: May 11, 2017

(65) Prior Publication Data
US 2018/0241331 A1    Aug. 23, 2018

(51) Int. Cl.
*E21B 41/00* (2006.01)
*E21B 17/02* (2006.01)
(Continued)

(52) U.S. Cl.
CPC ............ *H02P 9/02* (2013.01); *E21B 41/0085* (2013.01); *H02K 7/1807* (2013.01);
(Continued)

(58) Field of Classification Search
CPC ........................... E21B 41/0085; E21B 17/028
See application file for complete search history.

(56) References Cited

U.S. PATENT DOCUMENTS

| | | |
|---|---|---|
| 4,646,896 A | 3/1987 | Hammond et al. |
| 4,732,225 A | 3/1988 | Jurgens et al. |

(Continued)

FOREIGN PATENT DOCUMENTS

| | | |
|---|---|---|
| EP | 2682689 | 1/2014 |
| GB | 2505124 | 2/2014 |
| GB | 2509931 | 7/2014 |

OTHER PUBLICATIONS

DE102016116277.9, "Office Action", dated Oct. 16, 2019, 7 pages.
(Continued)

*Primary Examiner* — Shane Bomar
(74) *Attorney, Agent, or Firm* — Kilpatrick Townsend & Stockton LLP

(57) ABSTRACT

A power generation device is provided. The power generation device can include a magnetic coupler. The magnetic coupler can be associated with a maximum torque output. The maximum torque output of the magnetic coupler can be based on a size of the magnetic coupler. The power generation device can also include an alternator coupled to the magnetic coupling device. The alternator can convert kinetic energy received from the magnetic coupling device into a current. The kinetic energy can be generated by the magnetic coupler using a rotational force transferred across the magnetic coupling device. The power generation device can also include a power converter device coupled to the alternator to shape the current from the alternator such that the maximum torque output is sufficient to cause the power converter to output a threshold current sufficient for operating a well tool powered using the power generation device.

21 Claims, 11 Drawing Sheets

(51) Int. Cl.
  *H02P 9/02* (2006.01)
  *H02K 7/18* (2006.01)
  *H02K 49/10* (2006.01)
  *H02P 9/48* (2006.01)
  *H02M 7/219* (2006.01)
  *E21B 7/04* (2006.01)

(52) U.S. Cl.
  CPC ......... *H02K 49/104* (2013.01); *H02K 49/108* (2013.01); *H02M 7/219* (2013.01); *H02P 9/48* (2013.01); *E21B 7/04* (2013.01)

(56) References Cited

U.S. PATENT DOCUMENTS

| | | | |
|---|---|---|---|
| 5,793,625 A | 8/1998 | Balogh | |
| 5,965,964 A | 10/1999 | Skinner et al. | |
| 6,456,514 B1 | 9/2002 | Perreault et al. | |
| 6,672,409 B1* | 1/2004 | Dock | E21B 7/046 166/66.5 |
| 7,201,239 B1 | 4/2007 | Perry et al. | |
| 7,504,963 B2 | 3/2009 | Hall et al. | |
| 7,707,878 B2 | 5/2010 | Kanayama et al. | |
| 8,033,328 B2* | 10/2011 | Hall | F16C 32/0436 166/65.1 |
| 2003/0132003 A1* | 7/2003 | Arauz | F04D 13/10 166/370 |
| 2005/0200210 A1 | 9/2005 | Kotsonis et al. | |
| 2007/0023185 A1 | 2/2007 | Hall et al. | |
| 2008/0047753 A1 | 2/2008 | Hall et al. | |
| 2010/0039074 A1 | 2/2010 | Brand et al. | |
| 2012/0139250 A1* | 6/2012 | Inman | F03B 15/06 290/52 |
| 2013/0000991 A1 | 1/2013 | Scholz et al. | |
| 2016/0053589 A1* | 2/2016 | Delgado | H02K 49/106 166/65.1 |
| 2016/0076305 A1* | 3/2016 | Blange | E21B 41/0085 175/24 |
| 2016/0079835 A1* | 3/2016 | Aoyama | H02K 49/10 310/68 D |
| 2016/0265315 A1* | 9/2016 | Frosell | H02K 7/1823 |
| 2017/0145817 A1* | 5/2017 | Douglas | E21B 47/18 |
| 2018/0223632 A1* | 8/2018 | Rajagopalan | H02K 7/18 |

OTHER PUBLICATIONS

GB1613361.3 , "Office Action", dated Jun. 24, 2019, 3 pages.
GC2016/32072 , "Office Action", dated Mar. 5, 2019, 3 pages.
Xia et al., "Different Torque Ripple Reduction Methods for Wind Energy Conversion Systems Using Diode Rectifier and Boost Converter", IEEE International Electric Machines & Drives Conference (IEMDC), May 2011 , pp. 729-734.
Lubin et al., "Experimental and Theoretical Analysis of Axial Magnetic Coupling under Steady-State and Transient Operation", IEEE Transactions on Industrial Electronics, 2013, 10 pages.
Lubin et al., "Simple Analytical Expressions for the Force and Torque of Axial Magnetic Couplings", IEEE Transactions on Energy Conversion, vol. 27, No. 2, 2012, pp. 536-546.
International Patent Application No. PCT/US2015/059380, "International Search Report and Written Opinion", dated Sep. 7, 2016, 12 pages.
United Kingdom Patent Application No. 1613361.3, Office Action dated Dec. 23, 2016, 8 pages.
United Kingdom Patent Application No. 1613361.3, Office Action dated Mar. 27, 2018, 4 pages.

* cited by examiner

CURRENT-SHAPING CIRCUIT FOR USE WITH MAGNETIC COUPLERS DOWNHOLE

TECHNICAL FIELD

The present disclosure relates generally to devices for use in a wellbore in a subterranean formation. More specifically, but not by way of limitation, this disclosure relates to a current-shaping circuit for use with magnetic couplers downhole.

BACKGROUND

A well system (e.g., oil or gas wells for extracting fluids from a subterranean formation) can include various devices that can be used for downhole applications in a wellbore. The devices may require and consume power during the downhole applications. A rotating mechanical system, along with a magnetic coupler and an alternator, can be used to provide power to devices during the downhole applications. For example, during downhole applications, torque transferred across the magnetic coupler can be used to generate mechanical energy. The mechanical energy can be provided to the alternator. The alternator may convert the mechanical energy into a current for the downhole tool.

In downhole applications, the size of the magnetic coupler can be dimensionally constrained by space available in the wellbore. The peak torque that can be transferred across the dimensionally constrained magnetic coupler can be insufficient to generate power for downhole applications.

DETAILED DESCRIPTION

Figure 1:
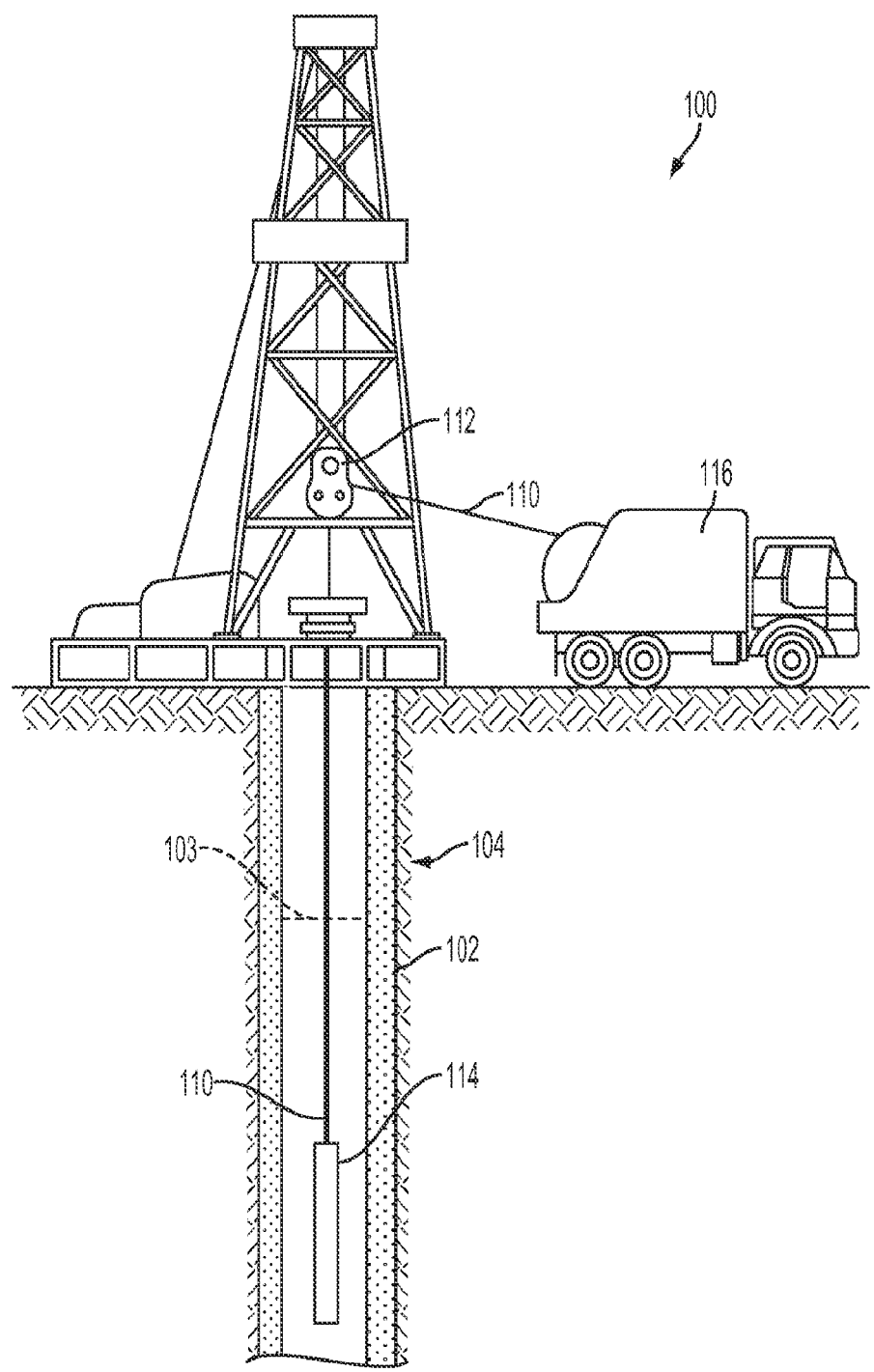
FIG. 1 is a schematic diagram of a well system in which a downhole tool can be deployed according to one example of the present disclosure.

Certain aspects and features of the present disclosure relate to a current-shaping circuit for use with magnetic couplers downhole. In downhole applications, an electrical generator (e.g., an alternator) can be used along with a magnetic coupler to provide power to devices used in the downhole applications. The current-shaping circuit can also be used to shape a current from the alternator into a sinusoidal current waveform. The current-shaping circuit can be used to eliminate a high frequency component of a torque associated with the magnetic coupler that is used to provide energy to the alternator.

In some examples, the magnetic coupler can be coupled to the alternator for providing power to devices used in downhole applications. A torque can be transferred across the magnetic coupler. The magnetic coupler can transfer energy generated by the torque to the alternator. The torque can include a constant component and a high frequency component. The current-shaping circuit can be used along with the magnetic coupler and the alternator. The current-shaping circuit can shape the current generated by the alternator into a sinusoidal current waveform. The sinusoidal current waveform can draw the constant component of the torque transferred across the magnetic coupler that is used to provide energy to the alternator. This may eliminate the high frequency component by preventing the high frequency component from being transferred across the magnetic coupler.

In some examples, the current-shaping circuit can include a pair of switches for shaping current from the alternator. The switches can be used to shape the current into the sinusoidal current waveform by controlling the flow of the current through the current-shaping circuit.

In some examples, the magnetic coupler can be dimensionally constrained by the size of a wellbore. The size of the dimensionally constrained magnetic coupler may limit the maximum or peak torque that can be transferred across the magnetic coupler. The dimensionally constrained magnetic coupler may be insufficient (e.g., too small) for transferring the amount of torque required to provide power to the devices used in the downhole applications. Using the current-shaping circuit to eliminate the high frequency component of the torque transferred across the magnetic coupler can enhance the peak torque capability of the dimensionally constrained magnetic coupler. For example, eliminating the high frequency component can reduce the amount of torque required to provide power to the devices. Reducing the amount of torque required to provide power to the devices can allow a smaller magnetic coupler to be used in the downhole applications.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative examples but, like the illustrative examples, should not be used to limit the present disclosure.

FIG. 1 is a schematic diagram of a well system 100 in which a downhole tool can be deployed. The well system 100 includes a wellbore 102 extending through various earth strata. The wellbore 102 extends through subterranean formation 104.

The well system 100 can include at least one downhole tool 114. The downhole tool 114 can be a measurement-while-drilling ("MWD") tool, a logging-while-drilling ("LWD") tool, a rotary steerable device, or a wireline formation testing tool. The downhole tool 114 can be coupled to a wireline 110, slickline, or coiled tube that can be deployed into the wellbore 102 from the surface 108. The wireline 110, slickline, or coiled tube can be guided into the wellbore 102 using, for example, a guide 112 or winch. In some examples, the wireline 110, slickline, or coiled tube can be wound around a reel 116.

The size of the downhole tool 114 can be dimensionally constrained by a size, width, or volume of the wellbore 102, or otherwise by the space available in the wellbore 102. For example, the size of the downhole tool 114 can be dimensionally constrained by the width 103 of the wellbore 102. The downhole tool 114 can also include a device or devices for providing power to the downhole tool 114 during downhole applications. The devices in the downhole tool 114 can also be dimensionally constrained by the size, width, or volume of the wellbore 102, or otherwise by the space available in the wellbore 102.

Figure 2:
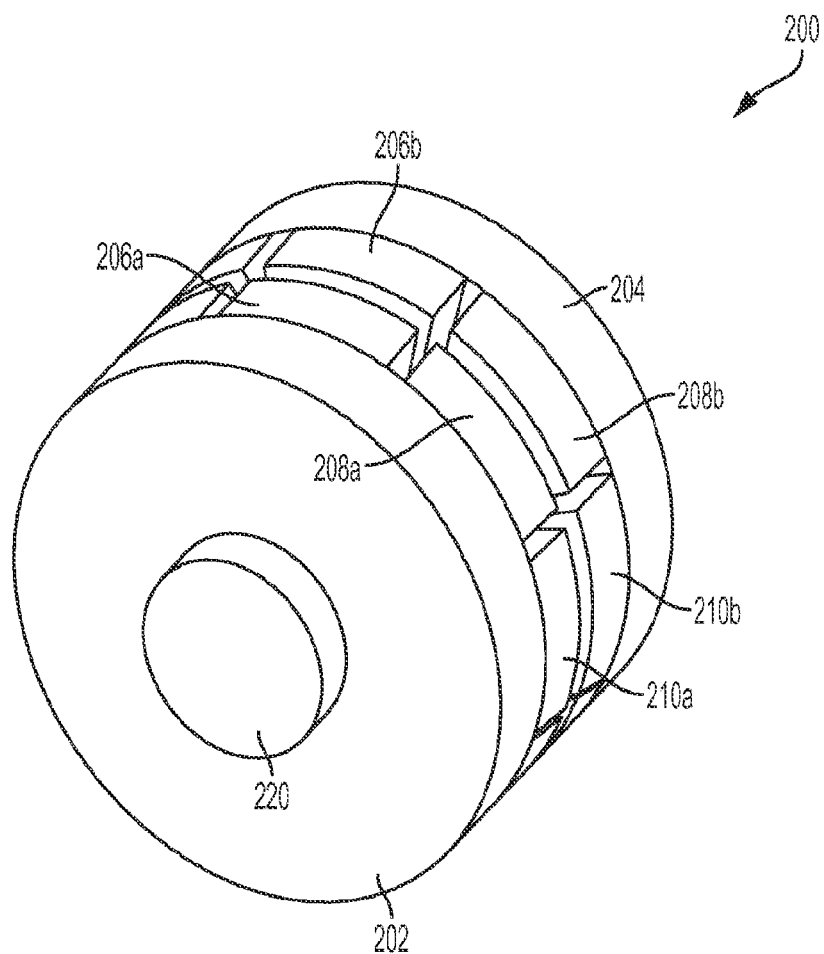
FIG. 2 is a perspective view depicting a radial magnetic coupler that can be included in a downhole tool according to one example of the present disclosure.

The downhole tool 114 can include a magnetic coupler that can be used along with an alternator to provide power to the downhole tool 114. For example, FIG. 2 is a perspective view depicting a radial magnetic coupler 200 that can be included in a downhole tool 114.

The radial magnetic coupler 200 can be any device for transferring energy from a first system to a second system without a physical connection between the first system and the second system.

The radial magnetic coupler 200 can include a first disc 202 and a second disc 204. The first disc 202 and the second disc 204 can each include spaced magnets for generating attractive or repulsive magnetic forces or fields. The magnets can be permanent magnets. For example, the first disc 202 can include magnets 206a, 208a, 210a mounted on a surface of the first disc 202. The second disc 204 can include magnets 206b, 208b, 210b mounted on a surface of the second disc 204. The magnets 206a, 208a, 210a can be mounted on a surface of the first disc 202 such that the magnets 206a, 208a, 210a are each facing the second disc 214. The magnets 206b, 208b, 210b can be mounted on a surface of the second disc 204 such that the magnets 206b, 208b, 210b are each facing the first disc 202. The first disc 202 and the second disc 204 can be positioned with respect to each other so that attractive or repulsive magnetic forces generated by the magnets on the first disc and second disc can cause the first disc 202 and the second disc 204 to be coupled and rotate around a common axis.

The first disc 202 and the second disc 204 can each be coupled to a rotating mechanical system (e.g., a shaft) or a rotary steerable device. For example, the first disc 202 can be coupled to a first shaft 220. Rotating the first shaft 220 can cause a rotational force or torque to be applied to the first disc 202. The torque can be any rotational force that causes an object to rotate. The torque can cause the first disc 202 to rotate in the same manner as the first shaft 220.

Figure 3:
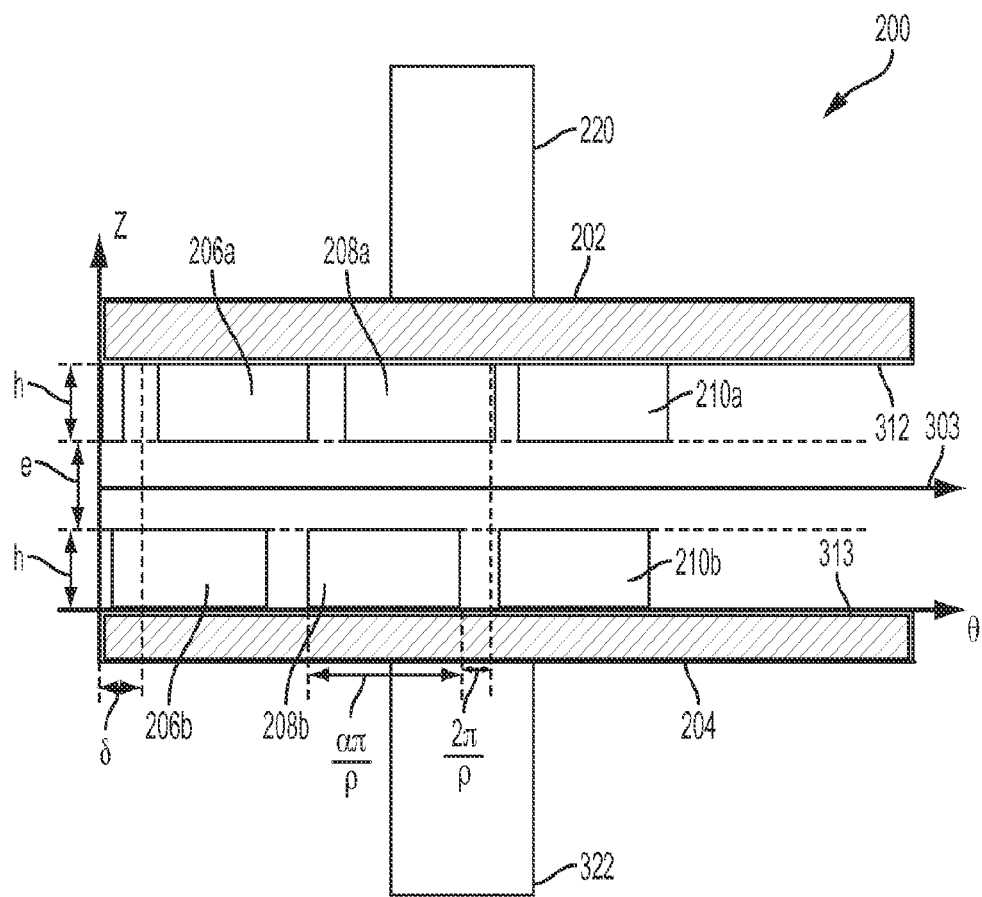
FIG. 3 is a cross-sectional side view of the radial magnetic coupler of FIG. 2 according to one example of the present disclosure.

FIG. 3 is a cross-sectional side view of the radial magnetic coupler 200 of FIG. 2. As discussed above, the radial magnetic coupler 200 can include a first disc 202 and a second disc 204. The first disc 202 can include magnets 206a, 208a, 210a mounted on a surface 312 of the first disc 202. The second disc 204 can include magnets 206b, 208b, 210b mounted on a surface 313 of the second disc 204. The first disc 202 and the second disc 204 can be positioned such that attractive or repulsive magnetic forces generated by magnets 206a, 208a, 210a, 206b, 208b, 210b can cause the first disc 202 and the second disc 204 to be coupled and rotate around a common axis 303.

Each of the magnets 206a, 206b, 208a, 208b, 210a, 210b, may have a magnet thickness h. The first disc 202 and second disc 204 can be positioned with respect to each other to allow an air-gap thickness e between the first disc 202 and the second disc 204. The air gap-thickness e can represent a distance, along an axis z, between magnets mounted on the first disc 202 and magnets mounted on the second disc 204. The air-gap-thickness e can be any distance sufficient to prevent physical contact between the first disc 202 and the second disc 204 but still allow the first disc 202 and second disc 204 to be magnetically couplable. The magnets 206a and 206b, 208a and 208b, 210a and 210b may be respectively coupled for generating attractive or repulsive magnetic forces or fields between the first disc 202 and the second disc 204. Increasing the air-gap-thickness e may decrease the attractive or repulsive magnetic force between the first disc 202 and the second disc 204. Increasing the air-gap-thickness e may cause the first disc 202 to become decoupled from the second disc 204. Although FIG. 3 depicts the first disc 202 and second disc 204 as each including three magnets, any suitable number of magnets may be mounted on the first disc 202 and second disc 204.

The radial magnetic coupler 200 can transfer torque from a rotating mechanical system (e.g., a shaft) to another rotating mechanical system (e.g., another shaft).

For example, the first disc 202 and second disc 204 may be coupled to a first shaft 220 and a second shaft 322, respectively. The first shaft 220 and the second shaft 322 may be any rotating mechanical system for providing torque to the first disc 202 and the second disc 222, respectively.

The first disc 202 can be magnetically coupled to the second disc 204 through attractive or repulsive magnetic forces generated by the magnets 206a, 206b, 208a, 208b, 210a, 210b, as described above. In some examples, rotating the first shaft 220 can cause torque from the first shaft 220 to be applied to the first disc 202. Applying the torque to the first disc 202 can cause the first disc 202 to rotate about the axis 303. Rotating the first disc 202 about the axis 303 can cause the torque to be applied to the second disc 204 due to attractive or repulsive forces between the first disc 202 and the second disc 204 generated by the magnets 206a, 206b, 208a, 208b, 210a, 210b. Applying the torque to the second disc 204 can cause the second disc 204 to rotate about the axis 303. Rotating the second disc 204 about the axis 303 can cause the second disc 204 to apply the torque to the second shaft 322. Applying the torque to the second shaft 322 can allow the torque to be transferred across the radial magnetic coupler 200, from the first shaft 220 to the second shaft 322, without physical contact between the first shaft 220 and the second shaft 322.

Transferring the torque across the radial magnetic coupler 200 can cause the radial magnetic coupler 200 to rotate about the axis 303 and generate mechanical energy (e.g., rotational kinetic energy).

In some example, the radial magnetic coupler 200 can be coupled to an electrical generator (e.g., an alternator). The radial magnetic coupler 200 can provide the mechanical energy, generated from the torque transferred across the magnetic coupler, to the alternator. The alternator can convert the mechanical energy into a current.

Figure 4:
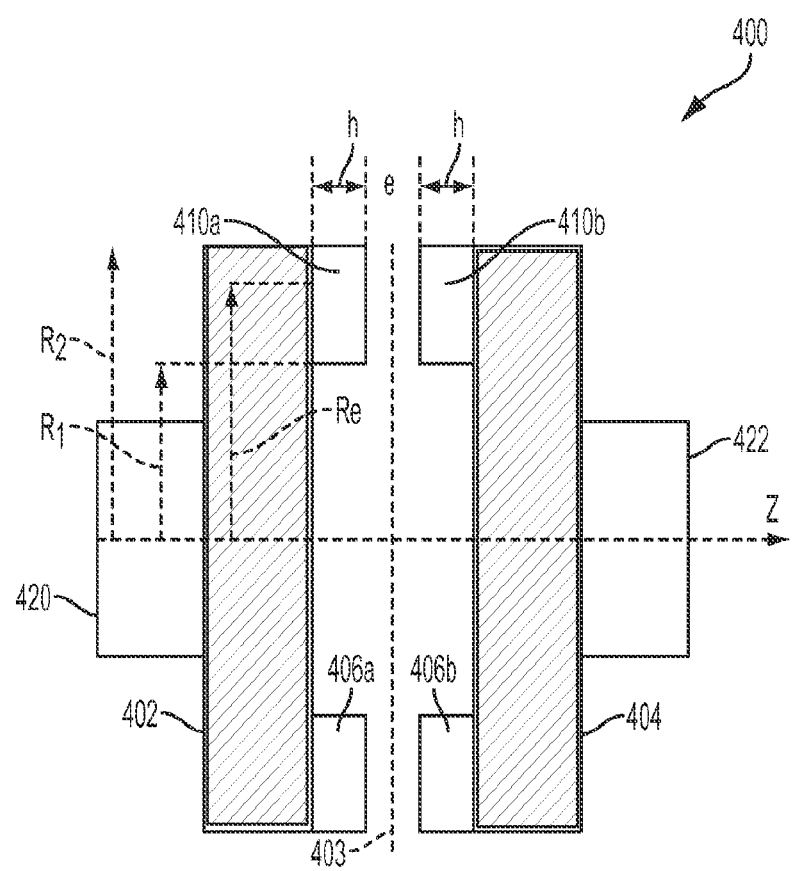
FIG. 4 is a cross-sectional side view depicting an axial magnetic coupler that can be included in a downhole tool according to one example of the present disclosure.

In other examples, the downhole tool 114 may include any suitable magnetic coupler for transferring force from a first system to a second system without a physical connection. The downhole tool 114 may include a magnetic coupler of any orientation, angular position or configuration. For example, FIG. 4 is a cross-sectional side view depicting an axial magnetic coupler 400 that can be included in the downhole tool 114. The first disc 402 and the second disc 404 of the axial magnetic coupler 400 can be coupled by attractive or repulsive magnetic forces. Applying a torque from a first shaft 420 can cause the first disc 402 to rotate. Rotating the first disc 402 can cause the torque to be applied to the second disc 404 due to attractive or repulsive forces between the first disc 302 and the second disc 304 generated by magnets 406a, 410a, 406b, 410b. Applying the torque to the second disc 404 can cause a second shaft 422 to rotate. Rotating the second shaft 422 can allow the torque to be transferred across the axial magnetic coupler 400. Transferring the torque across the axial magnetic coupler 400 can cause the axial magnetic coupler 400 to rotate about an axis 403. Rotating the axial magnetic coupler 400 about the axis 403 can generate mechanical energy.

In some examples, the size of one or more of the magnetic couplers 200, 400 can limit the peak torque capability of the magnetic coupler. The peak torque capability of the magnetic coupler is the maximum amount of torque that can be transferred across the magnetic coupler. For example, the peak torque capability of the magnetic coupler can be determined by solving the following formula:

$$T_{max} = \frac{16B_r^2 R_2^3}{3\pi\mu_0}\left(1-\left(\frac{R_1}{R_2}\right)^3\right)\sin^2\left(\alpha\frac{\pi}{2}\right)\frac{\sinh^2(\alpha)}{\sinh\left(2\alpha\left(1+\frac{e}{2h}\right)\right)}$$

In the formula above, $T_{max}$ is the peak torque capability of the magnetic coupler. $R_1$ is the inner radius of the magnets on a first disc of the magnet coupler. $R_2$ is the outer radius of the magnets on a second disc of the magnet coupler. $R_e$ is the mean radius of the magnets, h is the thickness of the magnets, and e is the air-gap thickness, as described above.

Figure 5:
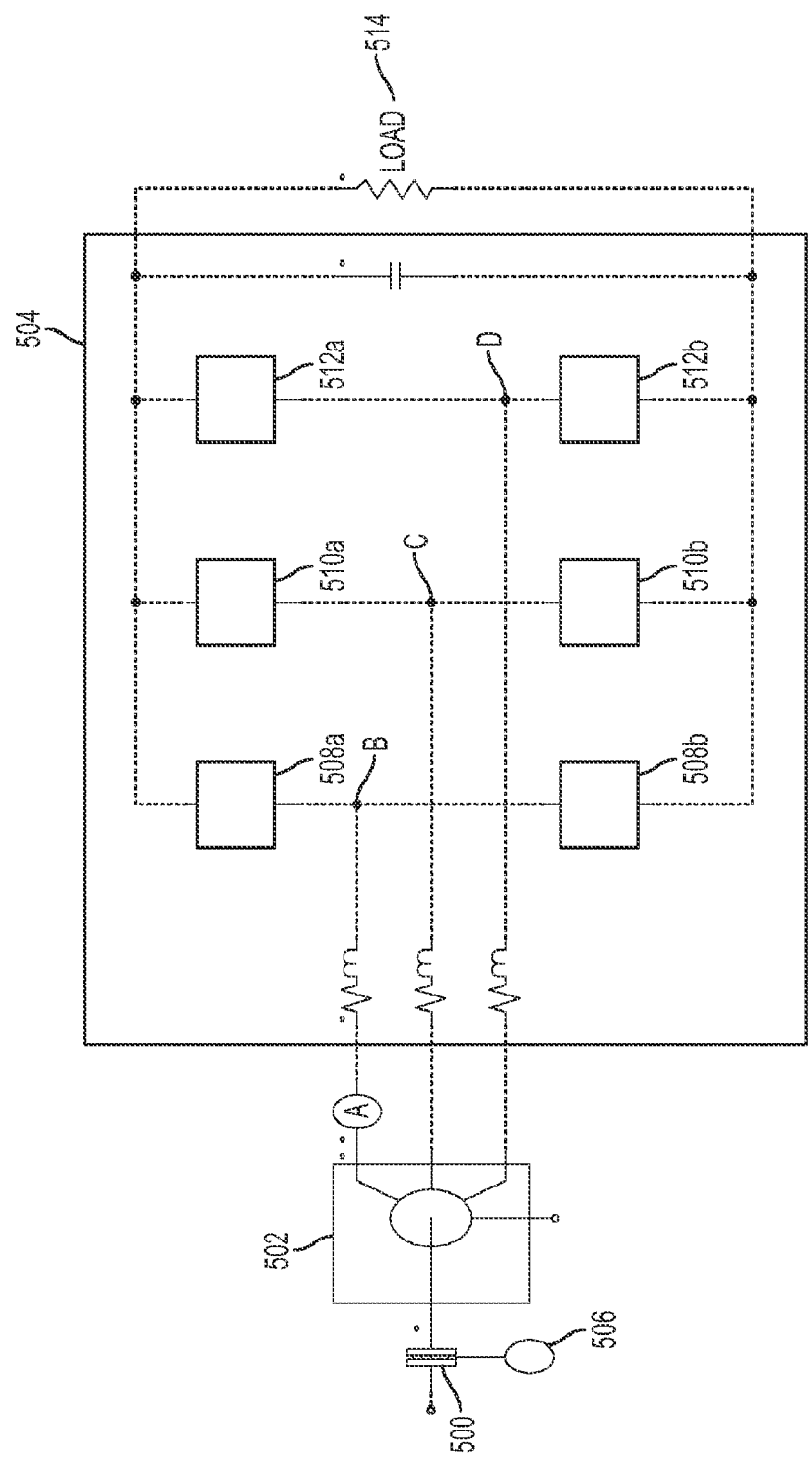
FIG. 5 is a schematic diagram depicting a magnetic coupler, used with an alternator and a current-shaping circuit, according to one example of the present disclosure.

In some examples, a magnetic coupler, along with a rotating mechanical system (e.g., the shaft 420) and an electrical generator (e.g., an alternator) can provide power for a downhole tool during downhole applications. For example, FIG. 5 is a schematic diagram depicting a magnetic coupler 500, used with an alternator 502 and a current-shaping circuit 504.

The magnetic coupler 500 can be any magnetic coupling device for transferring force from a first system to a second system without a physical connection between the first system and the second system. Examples of the magnetic coupler 500 can include a radial magnetic coupler, an axial magnetic coupler, etc. The magnetic coupler 500 can be coupled to a rotatable shaft 506. The shaft 506 can rotate and provide a torque when the shaft rotates about an axis. The torque can be any force that causes an object to rotate about an axis. Rotating the shaft 506 can apply the torque to the magnetic coupler 500. Applying the torque to the magnetic coupler 500 can cause the torque to be transferred across the magnetic coupler 500. Transferring the torque across the magnetic coupler 500 can cause the magnetic coupler 500 to rotate. Rotating the magnetic coupler 500 can generate mechanical energy (e.g., rotational kinetic energy). The magnetic coupler 500 can be electrically coupled to the alternator 502. The magnetic coupler 500 can provide the mechanical energy, generated from the torque transferred across the magnetic coupler 500, to the alternator 502.

The alternator 502 can be any device for converting mechanical energy into electrical energy and providing an alternating current. The alternator 502 can convert the mechanical energy from the magnetic coupler 500 into an alternating current. The alternator 502 can provide the current to a load 514. One example of the alternator 502 is a three-phase alternator. A three-phase alternator can output three phases of output current.

The alternator 502 can be electrically coupled to a current-shaping circuit 504. The current from the alternator 502 can flow through the current-shaping circuit 504. In some examples, the current from the alternator 502 can flow through the current-shaping circuit 504 based on an input voltage value and an output voltage value. The current from the alternator 502 can flow through the current-shaping circuit 504 if the input voltage value is higher than the output voltage value.

The current-shaping circuit 504 can be any circuit for controlling the direction of the current flow from the alternator 502 as the current flows through the current-shaping circuit 504. Examples of the current-shaping circuit 504 include an active rectifier, a Vienna converter, a single-phase converter based three-phase circuit, a multi-switch topology with a diode bridge rectifier, etc. The current-shaping circuit 504 can shape the current from the alternator 502 into a sinusoidal current waveform as the current flows through the current-shaping circuit 504. An example of a sinusoidal current wave form includes a waveform that is shaped in the form of a sine wave (e.g., a wave shaped as a curve representing periodic oscillations of constant amplitude as given by a sine function).

The current-shaping circuit 504 can include one or more devices for shaping the current from the alternator 502 into a sinusoidal current waveform. The current-shaping circuit 504 can also convert the alternating current from the alternator 502 into a direct current and eliminate a high frequency component of torque transferred across the magnetic coupler 500. The current-shaping circuit 504 can include pairs of switches 508a and 508b, 510a and 510b, 512a and 512b. Examples of the switches 508a, 508b, 510a, 510b, 512a, 512b can include a MOSFET, or other transistors, etc., for configuring or controlling the current from the alternator 502. The pairs of switches 508a, 508b, 510a, 510b, 512a, 512b can be respectively coupled to each other for controlling the flow of the current from the alternator 502. The pairs of switches 508a and 508b, 510a and 510b, 512a and 512b can control the flow of the current from the alternator 502 to shape the current into a sinusoidal current waveform.

For example, the alternator 502 can be a three-phase alternator. The alternator 502 can output three phases of output current. Each switch in the pairs of switches 508a-b, 510a-b, 512a-b can receive a signal (e.g., from a processor or other electrical circuit). The signal can configure each switch in the pair of switches 508a-b, 510a-b, 512a-b to be in an ON or OFF state based on a measured current value at a point in time and a specified current value. For example, the current-shaping circuit 504 can measure the current from the alternator 502 at a phase B (e.g., by using a measurement module), to determine a measured current value at phase B. The current-shaping circuit 504 can compare the measured current value at phase B, using a comparator or other suitable device, to a specified current value provided by a processor or other electrical circuit. If the measured current value at phase B is below the specified current value, the switch 508a, can receive a signal for configuring the switch

508a. The signal can configure the switch 508a to be in an ON state. The switch 508b can receive a signal for configuring the switch 508b to be in an OFF state. Configuring the switch 508a to be in an ON state and configuring the switch 508b to be in an OFF state can control the flow of the current to be in a positive direction. If the measured current value at phase B is above the specified current value, the switch 508a can receive a signal that can configure the switch 508a to be in an OFF state. The switch 508b can receive a signal that can configure the switch 508b to be in an ON state. Configuring the switch 508a to be in an OFF state and configuring the switch 508b to be in an ON state can control the flow of the current to be in a negative direction. The switches 510a-b, 512a-b can be configured in a substantially similar manner for controlling the flow of the current at phase C and phase D. Configuring each switch in the pair of switches 508a-b, 510a-b, 512a-b to be in an ON or OFF state to control the flow of the current from the alternator 502 can shape the current into a sinusoidal current waveform.

Figure 6:
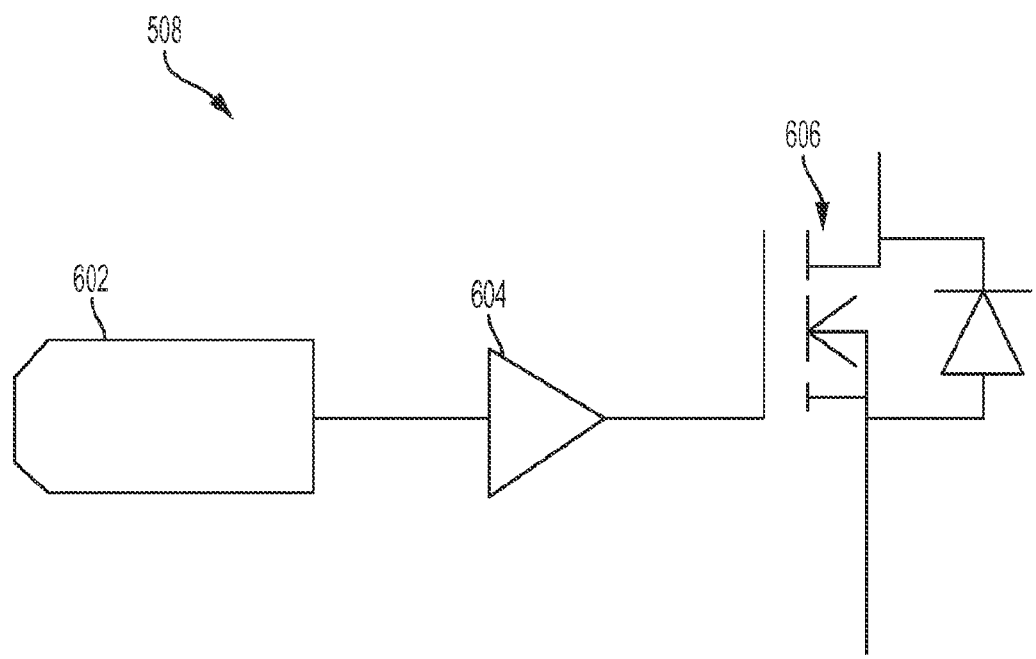
FIG. 6 is a schematic diagram depicting a switch of FIG. 5 according to one example of the present disclosure.

FIG. 6 is a schematic diagram depicting a switch 508 of FIG. 5. The switch 508 can include one or more devices for controlling the flow of the current from an alternator (e.g., the alternator 502 of FIG. 5) for shaping the current into a sinusoidal current waveform. For example, the switch 508 can include a pulse-width modulator device 602, a diode 604, and a transistor 606. The pulse-width modulator device 602 can be any device for controlling the switch 508 to be in an ON or OFF state. The diode 604 can allow current to flow through a current-shaping circuit (e.g., the current-shaping circuit 504 of FIG. 5) in a particular direction. The diode 604 can be used to control the direction of the current from the alternator for shaping the current into a sinusoidal current waveform. The transistor 606 can be used for amplifying or switching electronic signals. An example of the transistor 606 can include a MOSFET (as depicted in FIG. 6) or other suitable transistor. Configuring devices in the switch 508 can control the flow of the current from the alternator. Controlling the flow of the current from the alternator can shape the current into a sinusoidal current waveform.

Figure 7:
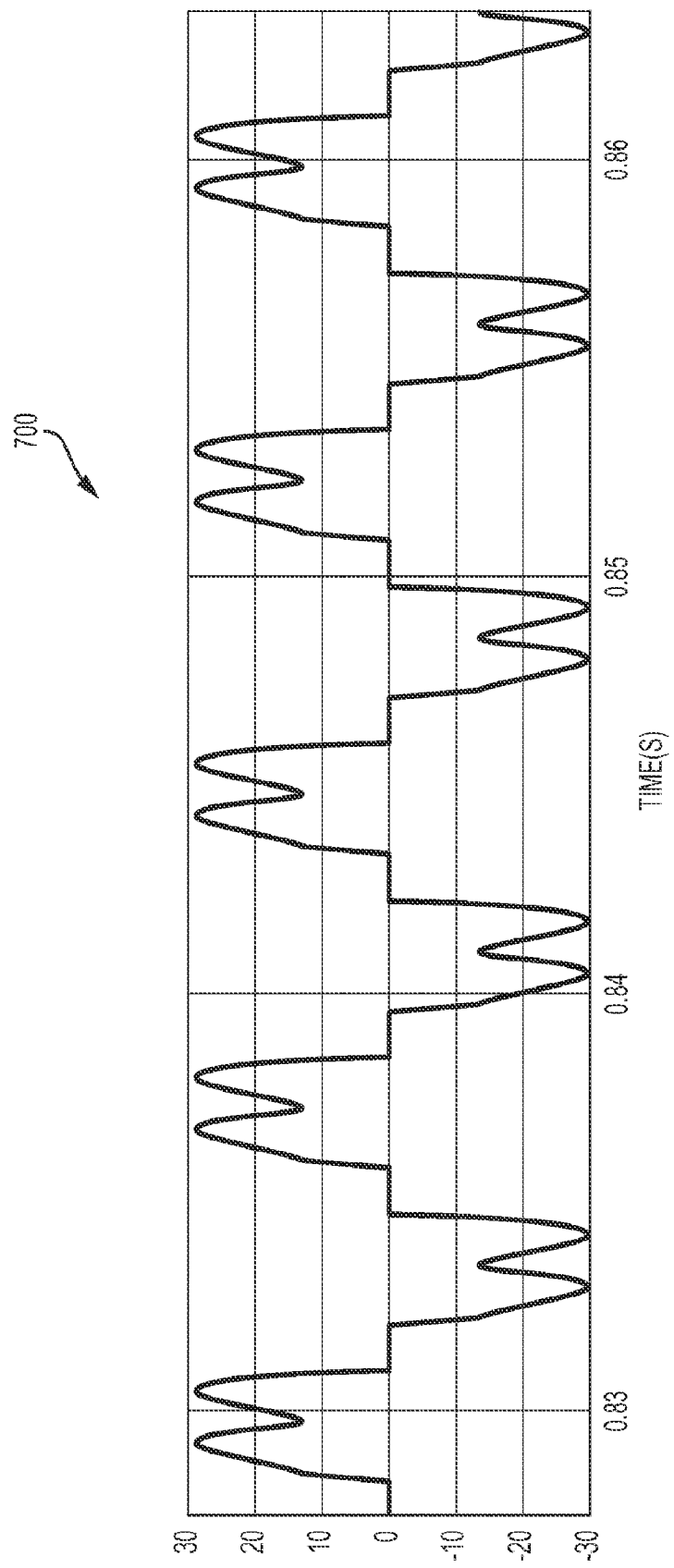
FIG. 7 is a graph depicting a current waveform generated by a magnetic coupler and an alternator in the absence of a current-shaping circuit according to one example of the present disclosure.

FIG. 7 is a graph 700 depicting a current waveform generated by a magnetic coupler and an alternator in the absence of a current-shaping circuit. As depicted in FIG. 7, the current waveform is discontinuous and includes intervals of time where the current value remains at zero.

Figure 8:
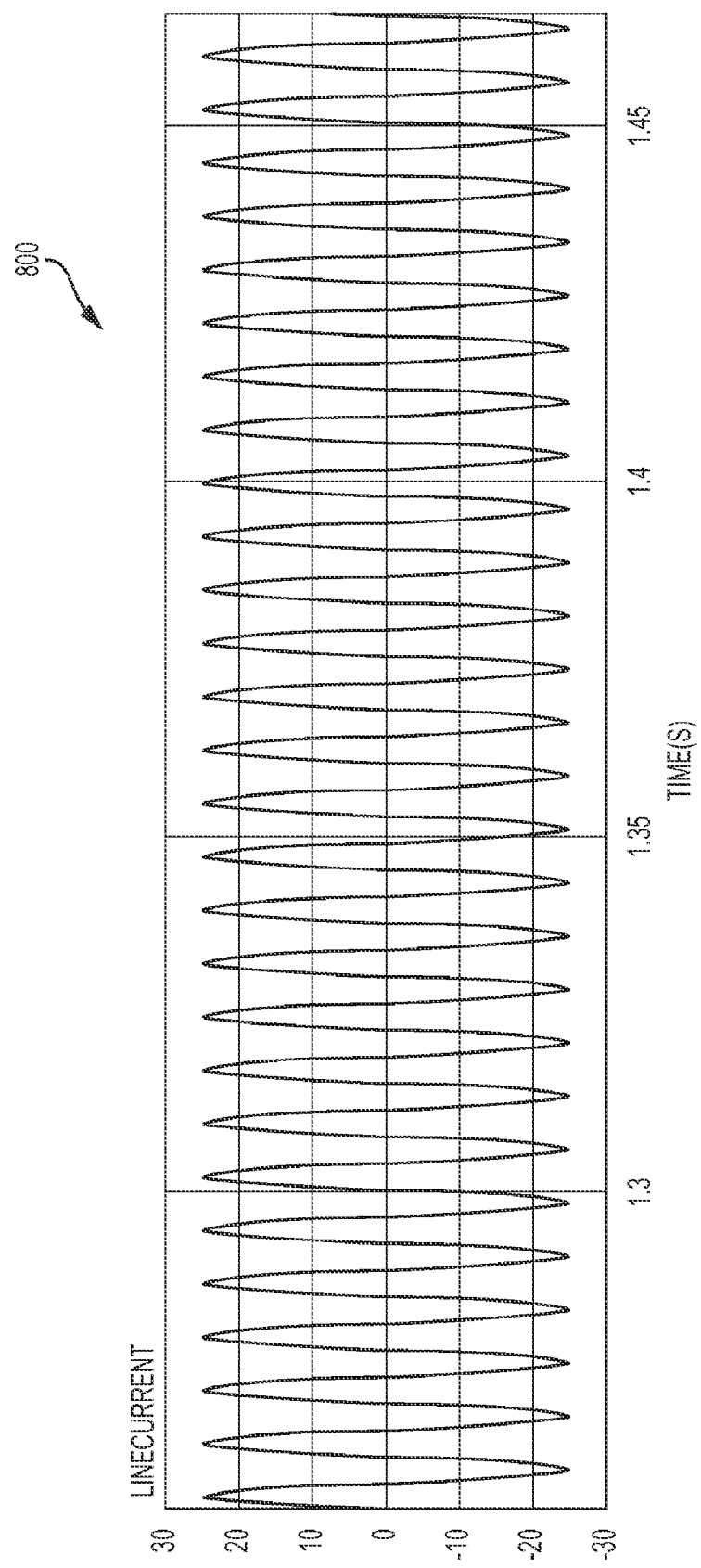
FIG. 8 is a graph depicting a sinusoidal current waveform generated when a current-shaping circuit is used along with a magnetic coupler and an alternator according to one example of the present disclosure.

FIG. 8 is a graph 800 depicting a sinusoidal current waveform generated when a current-shaping circuit is used along with a magnetic coupler and an alternator. As depicted in FIG. 8, when a current-shaping circuit is operating, the current-shaping circuit can shape the current from an alternator into a sinusoidal current waveform shaped as a curve representing periodic oscillations of constant amplitude.

Figure 9:
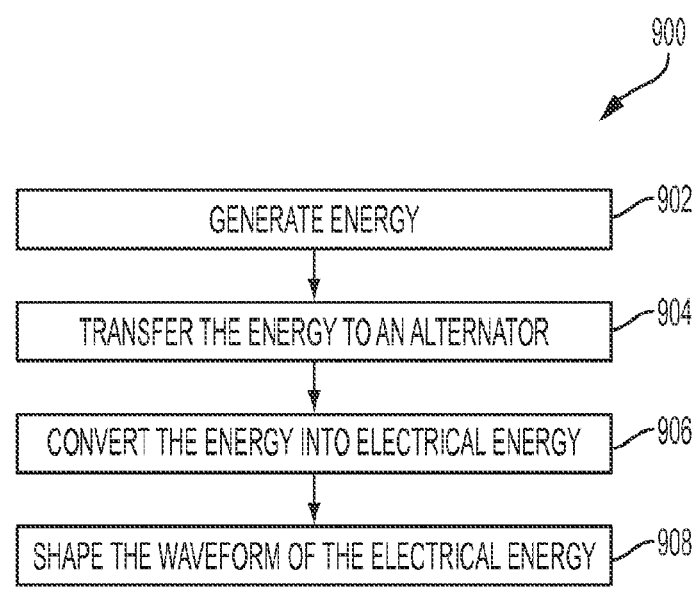
FIG. 9 is a flow chart depicting a process for shaping a current to be used for a downhole application according to one example of the present disclosure.

FIG. 9 is a flow chart depicting a process 900 for shaping a current to be used for a downhole application.

In block 902, energy is generated. In some examples, a magnetic coupler (e.g., the magnetic coupler 500 of FIG. 5) can generate mechanical energy (e.g., a rotational kinetic energy). The magnetic coupler can be a magnetic coupler for transferring torque from a first system to a second system without physical contact between the first system and the second system. The magnetic coupler can be coupled to a rotating mechanical system (e.g., the rotatable shaft 506 of FIG. 5). The mechanical system can rotate and apply torque to the magnetic coupler. Applying torque to the magnetic coupler can cause the magnetic coupler to rotate about an axis. Rotating the magnetic coupler about an axis can cause the magnetic coupler to generate mechanical energy.

In block 904, the energy is transferred to an alternator. In some examples the magnetic coupler can transfer the energy to an alternator (e.g., the alternator 502 of FIG. 5). For example, the magnetic coupler can be electrically coupled to the alternator for transferring mechanical energy to the alternator.

In block 906, the energy is converted into electrical energy. In some examples, the alternator can convert the energy into electrical energy. For example, the alternator can convert the mechanical energy provided from the magnetic coupler into electrical energy. In some examples, the alternator can convert the mechanical energy into an alternating current waveform. The alternator can convert the mechanical energy into three phases of output current.

In block 908, the waveform of the electrical energy is shaped. In some examples, a current-shaping circuit (e.g., the current-shaping circuit 504 of FIG. 5) can shape the waveform of the electrical energy. For example, the current-shaping circuit can be electrically coupled to the alternator. The current-shaping circuit can be any circuit, device, or group of devices for controlling the flow of the current from the alternator, for shaping the current, as the current flows through the current-shaping circuit.

The current-shaping circuit can shape the current from the alternator by shaping the current into a sinusoidal current waveform as the current flows through the current-shaping circuit. The current-shaping circuit can include pairs of switches (e.g., the pairs of switches 508a-b, 510a-b, 512a-b of FIG. 5). Examples of the switches can include a MOSFET, or other transistors, etc., for controlling the flow of the current from the alternator. The pairs of switches can control the direction of flow of the current from the alternator. Controlling the direction of flow of the current form the alternator can shape the current into a sinusoidal current waveform. In some examples, each switch in the pairs of switches can be configured to be in an ON or OFF state. Configuring each switch to be in an ON or OFF state can control the direction of flow of the current from the alternator over a period of time. Controlling the direction of flow of the current can shape the current into a sinusoidal current waveform.

In some examples, the current-shaping circuit can shape the current from the alternator into the sinusoidal current waveform for eliminating a high frequency component of the torque transferred across the magnetic coupler that is used to generate the electrical energy. For example, the torque applied to the magnetic coupler can include a constant component and a high frequency component. The torque can cause the magnetic coupler to rotate and provide mechanical energy to the alternator. The alternator can convert the mechanical energy into a current. The current-shaping current can be coupled to the alternator. The current-shaping circuit can shape the current from the alternator into the sinusoidal current waveform. The sinusoidal current waveform can draw the constant component of the torque from the magnetic coupler, which may eliminate the high frequency component of the torque. In some examples, the current-shaping circuit can convert the current from the alternator from an alternating current into a direct current and eliminate the high frequency component of the torque. In some examples, the current-shaping circuit can include a rectifier for converting the alternating current from the alternator into a direct current.

Figure 10:
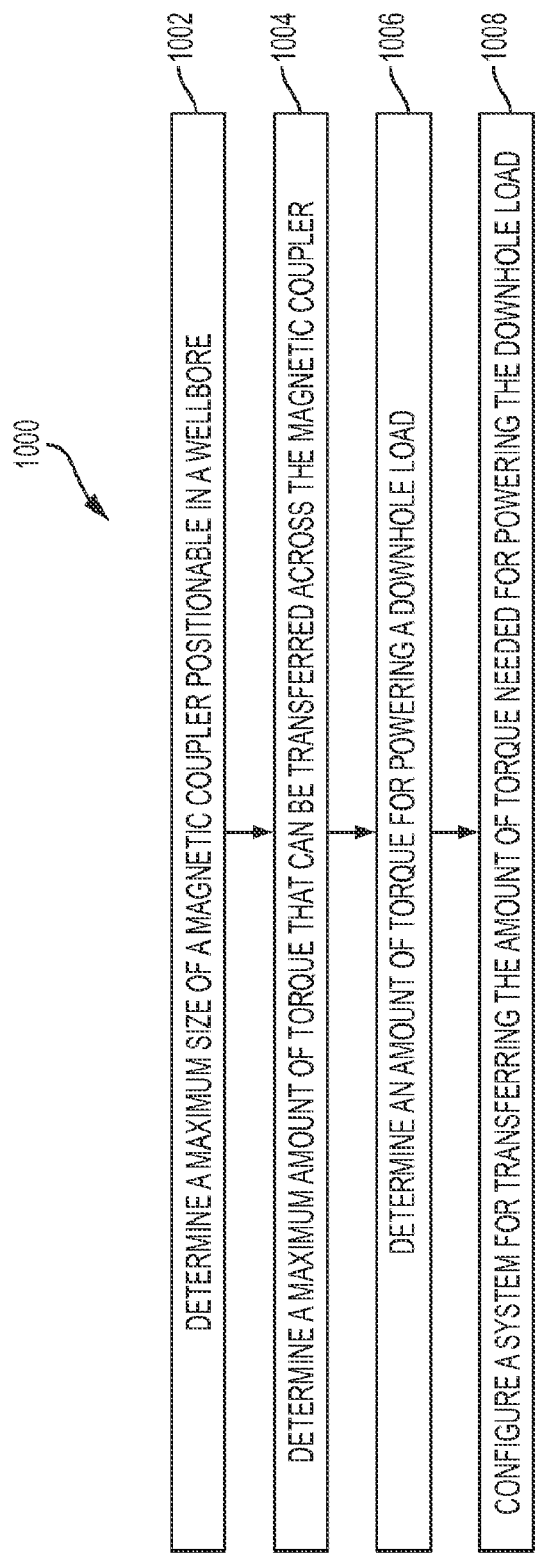
FIG. 10 is a flow chart depicting a process for configuring a system for enhancing the peak torque capability of a dimensionally constrained magnetic coupler according to one example of the present disclosure.

FIG. 10 is a flow chart depicting a process 1000 for configuring a system for enhancing the peak torque capability of a dimensionally constrained magnetic coupler.

In block 1002, a maximum size of a magnetic coupler positionable in a wellbore is determined. In some examples, a magnetic coupler can be dimensionally constrained by a size, width, or volume of a wellbore, or otherwise by the space available in the wellbore. The maximum size of the magnetic coupler positionable in the wellbore may correspond to the size, width, volume or space available in the wellbore. The size of the magnetic coupler can correspond to the dimensions of a shape of the magnetic coupler. The size of the magnetic coupler can be measured by the area, circumference, diameter, radius, or the like, of the shape of the magnetic coupler. In some examples, the size of the magnetic coupling device can be measured by an air-gap thickness of the magnetic coupler and the area, circumference, diameter, radius, thickness or the like, of the magnets include in the magnetic coupler.

In block 1004, a maximum amount of torque that can be transferred across the magnetic coupler is determined. The maximum amount of torque that can be transferred across the magnetic coupler is the peak torque capability of the magnetic coupler. In some examples, the size of the magnetic coupler can determine the maximum amount of torque that can be transferred across the magnetic coupler. For example, the maximum amount of torque that can be transferred across the magnetic coupler can be determined by solving the following formula:

$$T_{max} = \frac{16 B_r^2 R_2^3}{3\pi\mu_0}\left(1-\left(\frac{R_1}{R_2}\right)^3\right)\sin^2\left(\alpha\frac{\pi}{2}\right)\frac{\sinh^2(\alpha)}{\sinh\left(2\alpha\left(1+\frac{e}{2h}\right)\right)}$$

In the formula above, $T_{max}$ is the peak torque capability of the magnetic coupler and $B_r$ is the remanence of the magnets in the magnetic coupler. $R_1$ is the inner radius of the magnets included in the magnetic coupler, $R_2$ is the outer radius of the magnets included in the magnetic coupler, $\mu_0$ is a coefficient of friction, a is the pole-arc to pole-pitch ratio of the magnets included in the magnetic coupler, h is the thickness of the magnets included in the magnetic coupler, and e is the air-gap thickness of the magnets included in the magnetic coupler.

In block 1006, an amount of torque for powering a downhole load is determined. In some examples, the downhole load (e.g., the load 514) can require an amount of torque from the magnetic coupler for powering the downhole load. The maximum amount of torque needed for powering the downhole load can be determined by solving the following formula:

$$T_{load} = T_{coupler} - J_L\frac{d\omega_L}{dt} + B_L\omega_L$$

In the formula above, $T_{coupler}$ is the torque being transferred across the magnetic coupler to the downhole load and $T_{load}$ is the torque needed from the magnetic coupler for powering the load. $J_L$ is the combined inertia of the magnetic coupler and the alternator and $B_L$ is the combined frictional coefficient of the magnetic coupler and the alternator. The torque being transferred across the magnetic coupler can be determined by solving the following formula:

$$T_{coupler} = T_{max}\sin(\rho\delta)k_c$$

In the formula above, $T_{max}$ is the peak torque capability of the magnetic coupler, $\rho$ is a pole-pair number of the magnetic coupler, $\delta$ is the torque angle, and $k_c$ is the correction factor. Using the formula for determining $T_{coupler}$, the formula for determining the torque needed from the magnetic coupler for powering the load, $T_{load}$, can be rewritten as the following formula:

$$T_{load} = T_{max}\sin(\rho\delta)k_c - J_L\frac{d\omega_L}{dt} + B_L\omega_L$$

In some examples, the torque needed from the magnetic coupler for powering the downhole load, $T_{load}$, can have a constant component and a high frequency component. The torque needed from the magnetic coupler for powering the downhole load can be represented by the following formula:

$$T_{Load} = T_{DC} + T_{AC}$$

In the formula above, $T_{DC}$ is the constant component needed from the magnetic coupler for powering the downhole load. $T_{AC}$ is the high frequency component of the torque needed from the magnetic coupler for powering the downhole load. Using the above formula, the torque needed from the magnetic coupler for powering the downhole load can be determined by solving the following formula:

$$T_{DC} + T_{AC} = T_{max}\sin(\rho\delta)k_c - J_L\frac{d\omega_L}{dt} + B_L\omega_L$$

A current-shaping circuit can eliminate the high frequency component, $T_{AC}$, of the torque needed from the magnetic coupler for powering the downhole load. Eliminating the high frequency component $T_{AC}$ can reduce the value of the peak torque capability of the magnetic coupler, $T_{max}$, needed to power the downhole tool. Reducing the $T_{max}$ value can allow a radius of a magnet included in the magnetic coupler (e.g., the outer radius $R_2$) to be reduced. Reducing a radius of a magnet included in the magnetic coupler can reduce the size of the magnetic coupler while still allowing the magnetic coupler to provide the amount of torque, $T_{DC}$, needed from the magnetic coupler for powering the downhole load.

In block 1008, a system for transferring the amount of torque needed for powering the downhole load is configured. In some examples, the system can be configured by configuring a current-shaping circuit to eliminate the high frequency component of the torque needed to power the downhole load. In some examples, the system can be configured by configuring a radius of a magnetic coupler such that the peak torque capability of the magnetic coupler, $T_{max}$, corresponds to the constant component $T_{DC}$ needed from the magnetic coupler for powering the downhole load.

Figure 11:
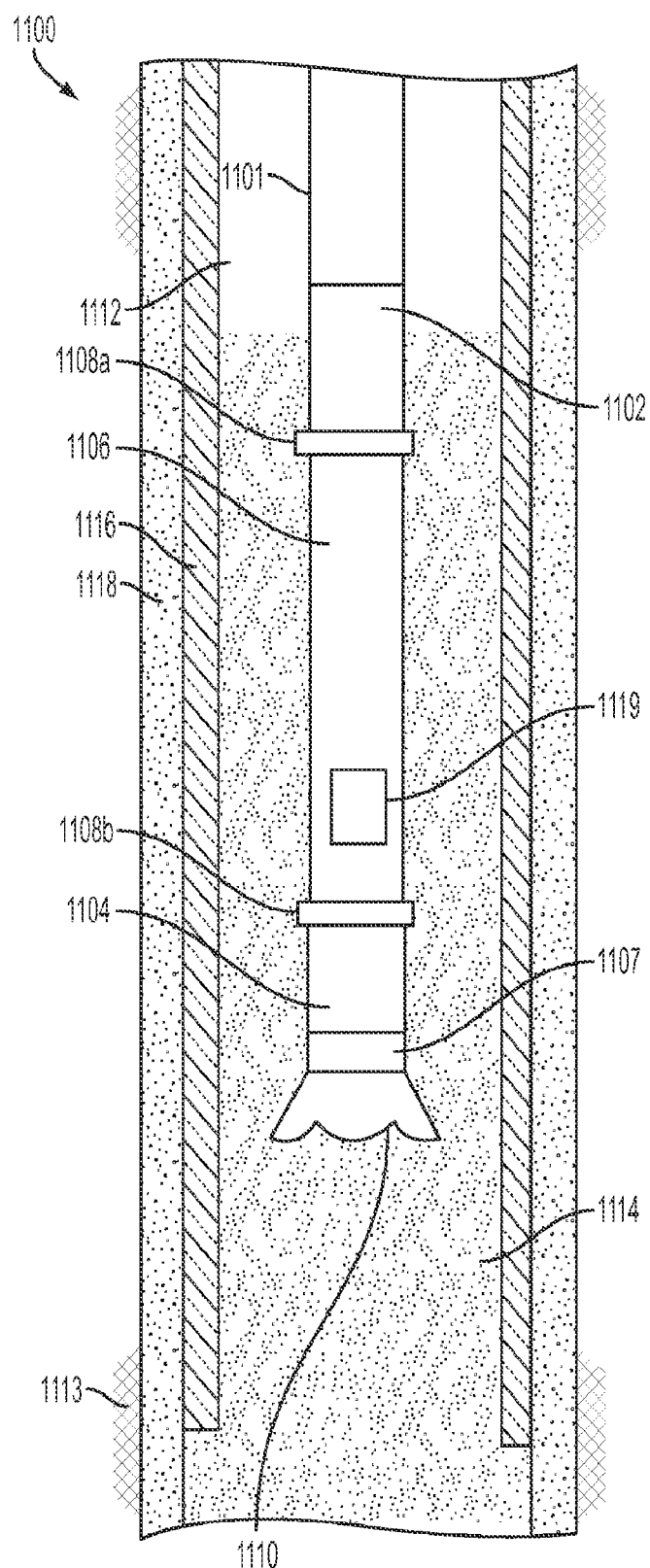
FIG. 11 is a diagram of another well system in which a magnetic coupler, along with an alternator and a current-shaping circuit, can be used in a downhole logging tool according to one example of the present disclosure.

One or more features and examples described above can be implemented in a well system that includes measurement—while drilling tools. For example, FIG. 11 is a cross-sectional side view of another well system 1100 in which a magnetic coupler, along with an alternator and a current-shaping circuit, can be used in a downhole logging tool according to one example of the present disclosure. In the example depicted in FIG. 11, the well system 1100 includes a wellbore. A casing string 1116 and a cement sheath 1118 can be positioned in the wellbore. In some examples, the cement sheath 1118 can couple the casing string 1116 to a wall of the wellbore. In some examples, the wellbore can include fluid 1114. An example of the fluid 1114 can include mud. The fluid 1114 can flow in an annulus 1112 positioned between a well tool 1101 and a wall of the casing string 1116.

The well tool 1101 can be positioned in the wellbore. In some examples, the well tool 1101 is a MWD tool. In some examples, the well tool 1101 can include a LWD tool, a pressure-while-drilling tool, a temperature-while-drilling tool, or any combination of these. In another example, the well tool 1101 can be a rotary steerable device or system. The well tool 1101 can include various subsystems 1102, 1104, 1106, 1107. For example, the well tool 1101 can include a subsystem 1102 that includes a communication subsystem. The well tool 1101 can also include a subsystem 1104 that includes a saver subsystem or a rotary steerable system. A tubular section or an intermediate subsystem 1106 (e.g., a mud motor or measurement-while-drilling module) can be positioned between the subsystems 1102, 1104. The well tool 1101 can include a drill bit 1110 for drilling the wellbore. The drill bit 1110 can be coupled to another tubular section or intermediate subsystem 1107 (e.g., a measuring-while-drilling module or a rotary steerable system).

In some examples, the well tool 1101 can include tubular joints 1108a, 1108b. Tubular joints 1108a, 1108b can allow the well tool 1101 to bend or can couple various well tool subsystems 1102, 1104, 1006, 1107 together. The well tool 1101 can also include a power generating device 1119 for providing current to the well tool 1101 for powering the well tool 1101. The power generating device 1119 can include a magnetic coupler (e.g., the magnetic couplers of FIGS. 2-5), along with an alternator (e.g., the alternator 502 of FIG. 5) and a current-shaping circuit (e.g., the current shaping circuit 504 of FIG. 5). The magnetic coupler can be electrically coupled to the alternator 502. The magnetic coupler can provide mechanical energy, generated from torque transferred across the magnetic coupler, to the alternator. The alternator can convert the mechanical energy from the magnetic coupler into an alternating current. The alternator can be electrically coupled to the current-shaping circuit. The current-shaping circuit can shape the current from the alternator into a sinusoidal current waveform. The current-shaping circuit can also convert the alternating current from the alternator into a direct current and eliminate a high frequency component of torque transferred across the magnetic coupler. The current from the alternator can be provided to the well tool 1101 after the current is shaped by the current-shaping circuit. The current can be provided by the power generating device 1119 to the well tool 1101 to power or operate the well tool 1101.

In some aspects, systems and methods relating to a current-shaping circuit for use with magnetic couplers downhole are provided according to one or more of the following examples:

Example #1

A power generation device can include a magnetic coupling device. The magnetic coupling device can be associated with a maximum torque output. The maximum torque output of the magnetic coupling device can be based on a size of the magnetic coupling device. The power generation device can also include an alternator coupled to the magnetic coupling device to convert kinetic energy received from the magnetic coupling device into a current. The kinetic energy can be generated by the magnetic coupling device using a rotational force transferred across the magnetic coupling device. The power generation device can also include a power converter device coupled to the alternator to shape the current from the alternator such that the maximum torque output of the magnetic coupling device is sufficient to cause the power converter device to output a threshold current sufficient for operating a well tool powered using the power generation device.

Example #2

The power generation device of Example #1 may feature the magnetic coupling device being a radial magnetic coupler or an axial magnetic coupler.

Example #3

The power generation device of any of Examples #1-2 may feature the power converter device including at least one of an active rectifier, a Vienna converter, a single-phase converter based three-phase circuit, or a multi-switch topology with a diode bridge rectifier to shape the current from the alternator.

Example #4

The power generation device of any of Examples #1-3 may feature the power converter device being coupled to the alternator to shape the current into a sinusoidal current waveform.

Example #5

The power generation device of any of Examples #1-4 may feature the power converter device being coupled to the alternator to convert the current from the alternator into a direct current and eliminating a high frequency component of the rotational force.

Example #6

The power generation device of any of Examples #1-5 may feature the power converter device including a pair of switches to control the flow of the current for shaping the current into a sinusoidal current waveform.

Example #7

The power generation device of any of Examples #1-6 may feature each switch in the pair of switches being a rectifier switch or a transistor.

Example #8

The power generation device of any of Examples #1-7 may feature each switch in the pair of switches configured to receive a signal for configuring each switch in the pair of switches to be in an ON or OFF state for controlling the flow of the current for shaping the current into the sinusoidal current waveform.

Example #9

A system can include a powered tool and a power delivery device configured to provide power to the powered tool. The power delivery device can include a magnetic coupling device. The magnetic coupling device can be associated with a maximum torque output based on a size of the magnetic coupling device. The power delivery device can also include an alternator coupled to the magnetic coupling device to convert kinetic energy received from the magnetic coupling device into a current. The kinetic energy can be generated by the magnetic coupling device using a rotational force transferred across the magnetic coupling device. The power delivery device can also include a power converter device coupled to the alternator to shape the current from the alternator such that the maximum torque output of the magnetic coupling device is sufficient to cause the power delivery device to output a threshold current sufficient for operating the powered tool.

Example #10

The system of Example #9 may feature the magnetic coupling device being a radial magnetic coupler or an axial magnetic coupler.

Example #11

The system of any of Examples #9-10 may feature the power converter device being coupled to the alternator to shape the current from the alternator into a sinusoidal current waveform.

Example #12

The system of any of Examples #9-11 may feature the power converter device including a pair of switches to control the flow of the current for shaping the current into the sinusoidal current waveform.

Example #13

The system of any of Examples #9-12 may feature the power converter device being coupled to the alternator to eliminate a high frequency component of the rotational force.

Example #14

A method can include determining a maximum size of a magnetic coupling device based on a size of a wellbore. The method can also include determining a maximum amount of torque that can be transferred across the magnetic coupling device for powering a well tool, based on the maximum size of the magnetic coupling device. The method can also include determining an amount of torque needed for providing power to the well tool. The method can also include configuring a system for using the magnetic coupling device to transfer the amount of torque needed for providing the power to the well tool.

Example #15

The method of Example #14 may feature configuring the system for using the magnetic coupling device to transfer the amount of torque needed for providing the power to the well tool including configuring a power converter device for shaping a current from an alternator into a sinusoidal current waveform.

Example #16

The method of any of Examples #14-15 may feature determining the maximum size of the magnetic coupling device including determining dimensions of the magnetic coupling device based on a value of a constant component of the amount of torque needed for providing the power to the well tool.

Example #17

The method of any of Examples #14-16 may feature configuring the system for using the magnetic coupling device to transfer the amount of torque needed for providing the power to the well tool including configuring a power converter device such that the power converter device to convert current from an alternator into a direct current and eliminate a high frequency component of the amount of torque needed for providing the power to the well tool.

Example #18

The method of Example #17 may feature configuring the power converter device to convert current from the alternator into the direct current including converting, by a rectifier or transistor, alternating current from the alternator into the direct current.

Example #19

The method of any of Examples #15-18 may feature shaping the current from the alternator into the sinusoidal current waveform including using at least a pair of switches to control the flow of the current.

Example #20

The method of any of Examples #15-19 may feature using at least the pair of switches including configuring each switch in the pair of switches to be in an ON or OFF state based on a measured current value and a specified current value.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A power generation device, the power generation device comprising:
 a magnetic coupling device associated with a maximum torque output based on a size of the magnetic coupling device;
 an alternator coupled to the magnetic coupling device to convert kinetic energy received from the magnetic coupling device into a current, the kinetic energy being generated by the magnetic coupling device using a rotational force transferred across the magnetic coupling device; and
 a power converter device coupled to the alternator to shape the current from the alternator such that the maximum torque output of the magnetic coupling device is sufficient to cause the power converter device to output a threshold current sufficient for operating a well tool powered using the power generation device.

2. The power generation device of claim 1, wherein the magnetic coupling device is a radial magnetic coupler or an axial magnetic coupler.

3. The power generation device of claim 1, wherein the power converter device includes at least one of an active rectifier, a Vienna converter, a single-phase converter based three-phase circuit, or a multi-switch topology with a diode bridge rectifier to shape the current from the alternator.

4. The power generation device of claim 1, wherein the power converter device is coupled to the alternator to shape the current into a sinusoidal current waveform.

5. The power generation device of claim 1, wherein the power converter device is coupled to the alternator to convert the current from the alternator into a direct current and eliminating a high frequency component of the rotational force.

6. The power generation device of claim 4, wherein the power converter device further comprises a pair of switches to control a flow of the current to shape the current into the sinusoidal current waveform.

7. The power generation device of claim 6, wherein each switch in the pair of switches is a rectifier switch or a transistor.

8. The power generation device of claim 6, wherein each switch in the pair of switches is configured to receive a signal for configuring each switch in the pair of switches to be in an ON or OFF state for controlling the flow of the current for shaping the current into the sinusoidal current waveform.

9. A system comprising:
an electronic tool; and
a power delivery device configured to provide power to the electronic tool, the power delivery device comprising:
  a magnetic coupling device associated with a maximum torque output based on a size of the magnetic coupling device,
  an alternator coupled to the magnetic coupling device to convert kinetic energy received from the magnetic coupling device into a current, the kinetic energy being generated by the magnetic coupling device using a rotational force transferred across the magnetic coupling device, and
  a power converter device coupled to the alternator to shape the current from the alternator such that the maximum torque output of the magnetic coupling device is sufficient to cause the power delivery device to output a threshold current sufficient for operating the electronic tool.

10. The system of claim 9, wherein the magnetic coupling device is a radial magnetic coupler or an axial magnetic coupler.

11. The system of claim 9, wherein the power converter device is coupled to the alternator to shape the current from the alternator into a sinusoidal current waveform.

12. The system of claim 11, wherein the power converter device further comprises a pair of switches to control a flow of the current for shaping the current into the sinusoidal current waveform.

13. The system of claim 9, wherein the power converter device is coupled to the alternator to eliminate a high frequency component of the rotational force.

14. A method comprising:
determining a maximum size of a magnetic coupling device based on a size of a wellbore;
determining a maximum amount of torque that can be transferred across the magnetic coupling device for powering a well tool, based on the maximum size of the magnetic coupling device;
determining an amount of torque needed for providing power to the well tool; and
configuring a system for using the magnetic coupling device to transfer the amount of torque needed for providing the power to the well tool, wherein the system includes a power converter device configured to shape a current such that the maximum amount of torque associated with the magnetic coupling component is sufficient to cause the power converter device to output an amount of current that is sufficient for operating the well tool.

15. The method of claim 14, wherein the current is received by the power converter device from an alternator, and wherein configuring the system for using the magnetic coupling device to transfer the amount of torque needed for providing the power to the well tool includes configuring the power converter device for shaping the current from the alternator into a sinusoidal current waveform.

16. The method of claim 14, wherein determining the maximum size of the magnetic coupling device includes determining dimensions of the magnetic coupling device based on a value of a constant component of the amount of torque needed for providing the power to the well tool.

17. The method of claim 14, wherein the current is received by the power converter device from an alternator, and wherein configuring the system for using the magnetic coupling device to transfer the amount of torque needed for providing the power to the well tool further includes:
configuring the power converter device to convert the current from the alternator into a direct current and eliminate a high frequency component of the amount of torque needed for providing the power to the well tool.

18. The method of claim 17, wherein configuring the power converter device to convert the current from the alternator into the direct current includes converting, by a rectifier or transistor, an alternating current from the alternator into the direct current.

19. The method of claim 15, wherein shaping the current from the alternator into the sinusoidal current waveform includes using at least a pair of switches to control a flow of the current.

20. The method of claim 19, wherein using at least the pair of switches includes configuring each switch in the pair of switches to be in an ON or OFF state based on a measured current value and a specified current value.

21. A method comprising:
determining an amount of torque needed for providing power to a well tool;
determining a maximum size of a magnetic coupling device based on a size of a wellbore, wherein determining the maximum size of the magnetic coupling device involves determining dimensions of the magnetic coupling device based on a value of a constant component of the amount of torque needed for providing power to the well tool; and
configuring a system for using the magnetic coupling device to transfer the amount of torque needed for providing the power to the well tool.

* * * * *